H. L. SPRAGUE.
Fishing-Tackles.
No. 155,266. Patented Sept. 22, 1874.
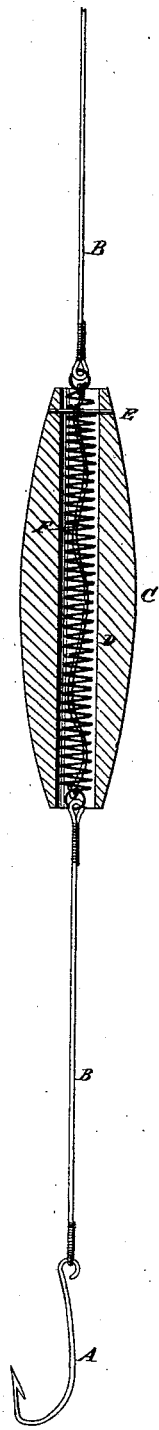
WITNESSES:
INVENTOR:
ATTORNEYS.

UNITED STATES PATENT OFFICE.

HENRY L. SPRAGUE, OF TOTTENVILLE, NEW YORK.

IMPROVEMENT IN FISHING-TACKLE.

Specification forming part of Letters Patent No. 155,266, dated September 22, 1874; application filed June 6, 1874.

*To all whom it may concern:*

Be it known that I, HENRY L. SPRAGUE, of Tottenville, Richmond county, New York, have invented a new and useful Improvement in Fishing-Tackle, of which the following is a specification:

The invention will first be fully described, and then pointed out in the claim.

The accompanying drawing illustrates my invention.

Similar letters of reference indicate corresponding parts.

A is the hook. B is the line; C, the sinker, and D the spring. This spring is preferably made of wire in spiral form; but it may be made of india-rubber or other similar elastic material. It forms a part of the line B, and may be three inches, more or less, in length. Both ends are connected with the line, as seen in the drawing. The sinker is made hollow, or with a hole through it longitudinally, which receives the spring. This hole through the sinker is of such a diameter that the spring expands and contracts readily therein. E is a pin through the sinker, which passes through or between two convolutions of the spring, and thereby fastens the spring to the sinker at the upper end. Within the spring is a strong flexible cord, F, attached to the line B at each end. The design of the cord is to limit the expansion of the spring. When the spring is contracted it curls up within the spring, as seen.

With the ordinary hook and line, when the fish takes the bait, the hook is liable to drop from his mouth unless it happens to catch while the bait is being swallowed.

When the spring is attached to the line and the bait is seized there is a constant pull on the line, and if the hook enters the mouth this back pull will cause the hook to catch, and the fish will be secured.

When the hook and line is set, the elasticity and yielding of the bait caused by the spring gives the fish courage to endeavor to obtain a better hold, and thus secures the hook, which leads to his own capture.

The spring may be used on the line without the sinker, if desired; but I prefer the arrangement shown.

I am aware that a spring has been made to form one intermediate portion of a fishing-line and placed within a hollow sinker; but

What I claim is—

The combination, with the fish-line, spiral spring D, and the sinker C, of the pin E and flexible cord F, arranged and applied as described and shown, and for the purpose specified.

HENRY L. SPRAGUE.

Witnesses:
   T. B. MOSHER,
   ALEX. F. ROBERTS.